March 7, 1961 S. R. MAYS ET AL 2,973,784
MODIFIED AXMINSTER LOOM AND METHOD
Filed July 14, 1959 7 Sheets-Sheet 1

INVENTORS:
SAMUEL R. MAYS
MAURICE W. WORTH
BY Hyde W. Ballard
ATTY.

March 7, 1961 S. R. MAYS ET AL 2,973,784
MODIFIED AXMINSTER LOOM AND METHOD
Filed July 14, 1959 7 Sheets-Sheet 2

INVENTORS:
SAMUEL R. MAYS
MAURICE W. WORTH
BY Hyde W. Ballard
ATTY.

March 7, 1961   S. R. MAYS ET AL   2,973,784
MODIFIED AXMINSTER LOOM AND METHOD
Filed July 14, 1959   7 Sheets-Sheet 4

INVENTORS:
SAMUEL R. MAYS
MAURICE W. WORTH
BY Hyde W. Ballard
ATTY.

March 7, 1961 S. R. MAYS ET AL 2,973,784
MODIFIED AXMINSTER LOOM AND METHOD
Filed July 14, 1959 7 Sheets-Sheet 5

INVENTORS:
SAMUEL R. MAYS
MAURICE W. WORTH
BY Hyde W. Ballard
ATTY.

March 7, 1961 S. R. MAYS ET AL 2,973,784
MODIFIED AXMINSTER LOOM AND METHOD
Filed July 14, 1959 7 Sheets-Sheet 6

INVENTORS:
SAMUEL R. MAYS
MAURICE W. WORTH
BY Hyde W. Ballard
ATTY.

March 7, 1961 S. R. MAYS ET AL 2,973,784
MODIFIED AXMINSTER LOOM AND METHOD
Filed July 14, 1959 7 Sheets-Sheet 7

INVENTORS:
SAMUEL R. MAYS
MAURICE W. WORTH
BY Hyde W. Ballard
ATTY.

United States Patent Office 2,973,784
Patented Mar. 7, 1961

2,973,784

MODIFIED AXMINSTER LOOM AND METHOD

Samuel R. Mays, Buena Vista, and Maurice W. Worth, Glasgow, Va., assignors to James Lees and Sons Company, Bridgeport, Pa., a corporation of Pennsylvania Filed July 14, 1959, Ser. No. 826,981

11 Claims. (Cl. 139—39)

This invention relates to pile fabric weaving and more particularly to a modified Axminster loom capable of producing a pattern effect in a loop pile Axminster fabric by means of weaving under and over the same pile wire in selected areas in the same row.

In Eisler and Moxley Patent No. 2,715,918, there is described a modified Axminster loom for weaving uncut or loop pile fabric. In this arrangement, however, only a single pile wire is used and all of the loops in each weftwise row are of the same height. The present invention incorporates a modification of this general type of loom in which a pattern bar is reciprocated to a position in which certain of the yarns are displaced to form a secondary shed composed only of warp pile yarns. Each wire is inserted into this secondary shed so that some of the pile warp yarns weave under the wire and other pile yarns weave over the same wire. The yarns weaving under the wire form ground pile in selected areas. In order to break up the appearance of the fabric thereby avoiding streaks, the pattern bar reverses 180° so that the same group of yarns is carried alternately over and under successively inserted pile wires.

A primary object of the invention, therefore, is to provide an attachment for an Axminster loom which selects certain pile yarns over a particular wire and other pile yarns under the same wire.

A further object of the invention is to provide a secondary warp pile shed into which pile wires are inserted.

A further object of the invention is to provide a pattern bar for an Axminster loom having stepped yarn contact faces, means for reciprocating said pattern bar towards and away from the pile yarns, and means for rotating said pattern bar to present the different pattern face to the yarns.

A further object of the invention is to provide a method for weaving a two-shot Axminster fabric in which some of the pile yarns form high loops and other pile yarns form ground pile in the same transverse row.

Further objects will be apparent from the specification and drawings in which.

The invention comprises essentially the provision in an Axminster type loom of a plurality of pile wires comprising preferably a set of four as shown in the accompanying drawings. These wires are successively inserted and withdrawn into various sheds of the pile warp yarns on every other insertion of the weft carrying needle. An automatically actuated mask prevents withdrawal and insertion of a wire on every stroke of the wire motion since the present invention is described in conjunction with a two-shot stufferless weave. The term "two-shot" indicates that there are two double wefts for each wire insertion or transverse row of pile. It will be understood that the invention can also be applied to a fabric woven with stuffer warps and more than two shots.

Figure 2:
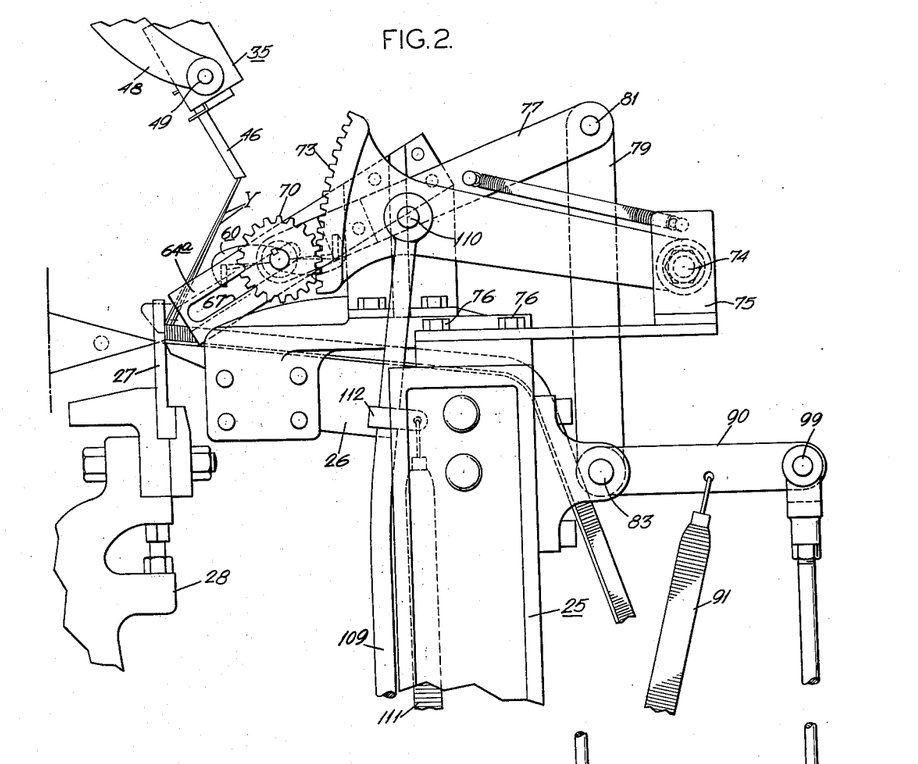
Fig. 2 is an end view of the structure seen in Fig. 1.

Referring now more particularly to the drawings, a modified Axminster loom of the type useful in the present invention is provided with a frame 25 on which the usual breast plate 26 is mounted. The oscillating reed 27 is carried in the lay 28 and beats up the pile wires 29 and the double weft shots 30 as is customary in weaving practice. As described generally in the Eisler and Moxley patent, the pile yarns Y are supplied from a yarn source, not shown, preferably a beam but alternatively a creel, through a tube frame 35. The tube frame 35 reciprocates from a raised position shown in Figs. 2 and 3 to the wipe-in position shown schematically in Fig. 17. In this lowered position the alternate (between wire) weft shots 30c are inserted.

The pile yarns Y are fed to the tube frame 35 by means of feed rollers 36 and 37 (Fig. 3), journaled in an adjustable bracket 38, which in turn is mounted on a frame 39. After passing around the rubber feed roller 37 and the grooved feed roller 36 the yarns pass over a tension bar 40 which is mounted at each side of the loom in a spring loaded arm 41 journaled to the loom frame 39 at 42. Tension is applied to the yarn through bar 40 by means of an extension spring 43 anchored to the frame structure. After passing around tension bar 40 the yarn also passes around a pair of yarn guide rollers or bars 44 and 45 on the tube frame 35 and thence through the individual tuft tubes 46, 46. The use of the spring loaded tension bar 40 provides a reservoir from which yarn is drawn to permit not only oscillation of tube frame 35 but also the minor and compensating variation in yarn feed caused by selecting some of the yarns to pass over the last inserted wires 29 and other yarns to pass under the same wire. Tube frame 35 is journaled at each end of the rigid clutch arms or carriers 48 journaled to the tube frame at 49. Tilting of the tube frame is accomplished through a separately anchored link 50 journaled to the tube frame at 51. This composite action of the tube frame is important to prevent interference with the reed 27 and other elements of the loom.

Pattern bar

Figures 3, 6:
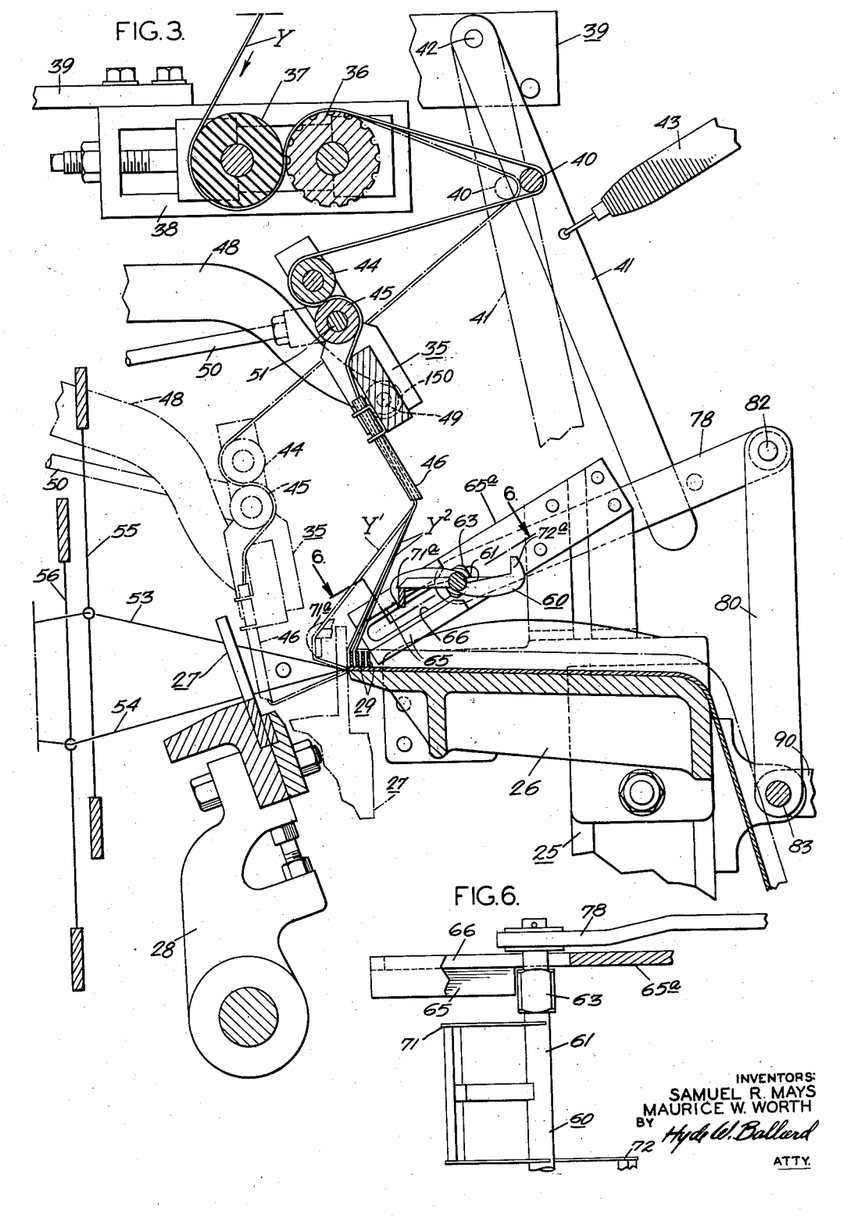
Fig. 3 is a sectional view as seen generally at 3—3 of Fig. 1 and showing in addition some of the yarn feed elements located above the portion of the loom seen in Fig. 1.
Fig. 6 is a fragmentary sectional detail as seen at 6—6 of Fig. 3.
Figures 4, 5, 8:
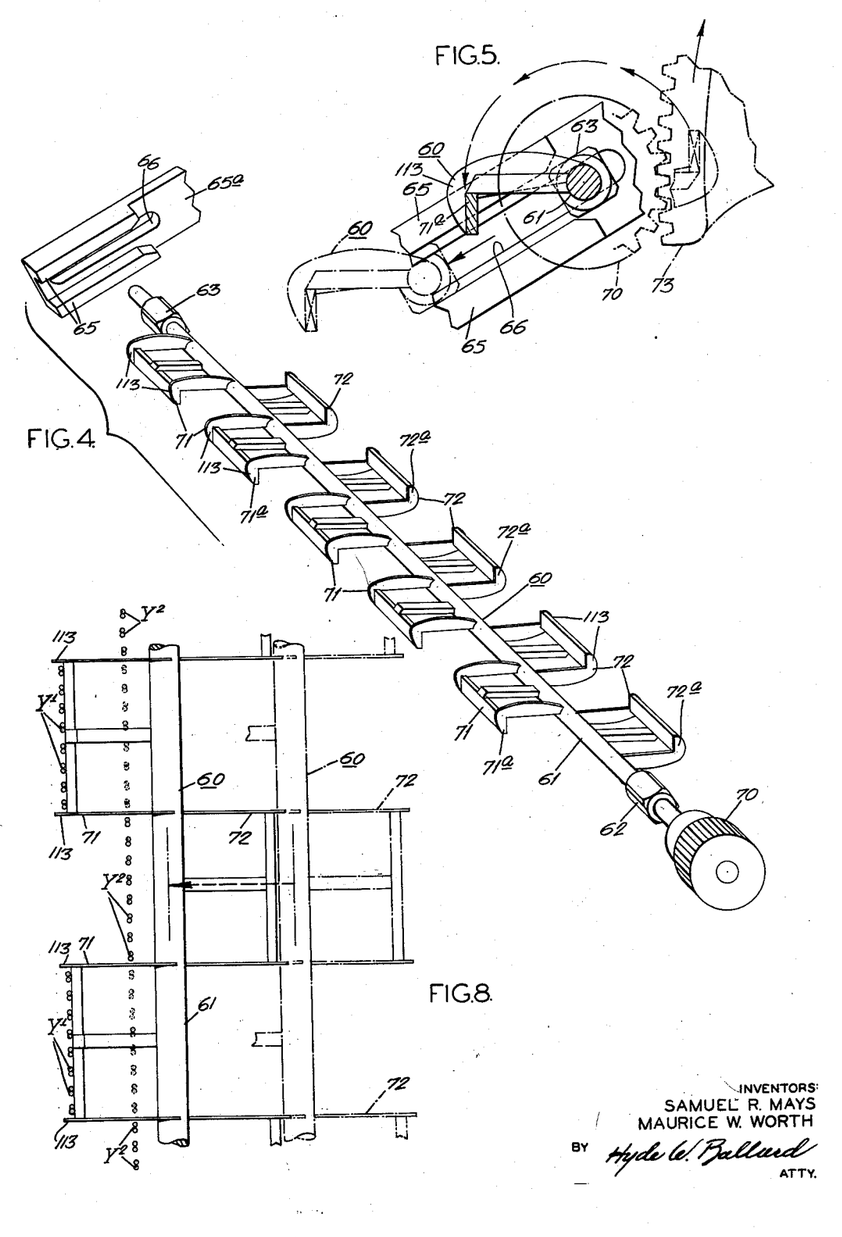
Fig. 4 is a perspective of the yarn controlling bar.
Fig. 5 is a fragmentary detail of a portion of the structure of Fig. 2.
Fig. 8 is a schematic illustration showing the separation of the pile yarns into the secondary wire shed.
Figure 7:
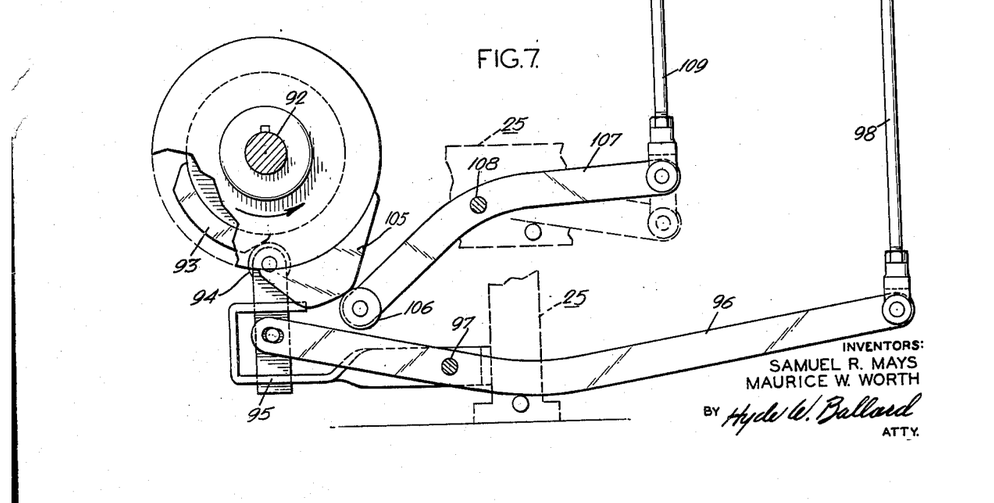
Fig. 7 is a sectional detail of the actuating mechanism for the yarn bar of Fig. 4.
Figures 9, 10:
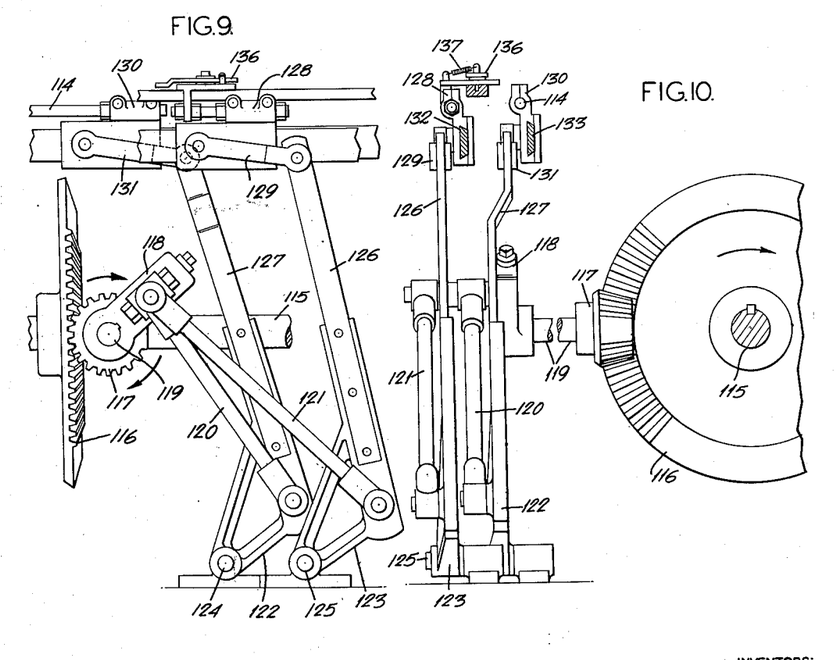
Fig. 9 is a front view of a portion of the loom showing the wire and needle motions.
Fig. 10 is an end view of the structure of Fig. 9.

As indicated above, the pile yarns are wiped into the shed formed by chain warps 53 and 54 in order to tie in the pile yarns under every alternate double weft 30. Chain warps 53 and 54 reverse under control of heddles 55 and 56 after the insertion of each double weft shot 30. Whenever a pile wire 29 is inserted, a secondary shed formed by the displacement of yarns Y, as at Y1 and Y2 as shown in Fig. 3 is formed with the tube frame 35 in its elevated position by means of a specially designed shed forming element 60. The details of the pattern bar or shed forming element 60 may be seen more clearly by referring to Fig. 4. A shaft 61 is provided with square shoulders or collars 62 and 63 near each end thereof. These collars are positioned to slide non-rotatably in ways 64 and 65 respectively. The shaft 61, however, is extended beyond shoulders 62 and 63 so that the shaft has a combined sliding and rotational movement in the elongated slots 66 and 67 in their respective brackets 65a and 64a. One end of shaft 61 is also provided with a pinion 70 in order to control the turning movement of the shaft. Along the central portion of shaft 61 we provide a plurality of steps which selectively contact and displace certain of the pile yarns Y to form the secondary shed. One side of shaft 61 has a plurality of spaced abutments 71, 71 which extend radially from the shaft. The distance between each abutment 71 corresponds roughly to the longitudinal length of each abutment. The opposite side of shaft 61 is provided with staggered abutments 72, 72 which register with the gaps between abutments 71.

The abutments or steps 71 and 72 in addition to performing the function of separating the sets of pile yarns Y1 and Y2 to form the secondary shed also provide a guide against which the pile wires 29 may run during their insertion. For this purpose each of the elements 71 and 72 has an L shaped nose 71a and 72a extending substantially at right angles to the main body of the step. As will be seen clearly in Figures 15 and 19, the steps 71a and 72a engage pile yarns Y1 when the shaft 61 is in its lowermost position and displace these yarns in an amount sufficient to permit the insertion of the wire 29. The innerface of the steps also serves as a guide or limit for preventing the engagement of the wire 29 with any of the displaced yarns Y1 during its insertion. Ordinarily the wire will be inserted in the position shown in Fig. 19 but in practice some contact with the steps 71a or 72a takes place.

Figures 1, 11, 12, 13:
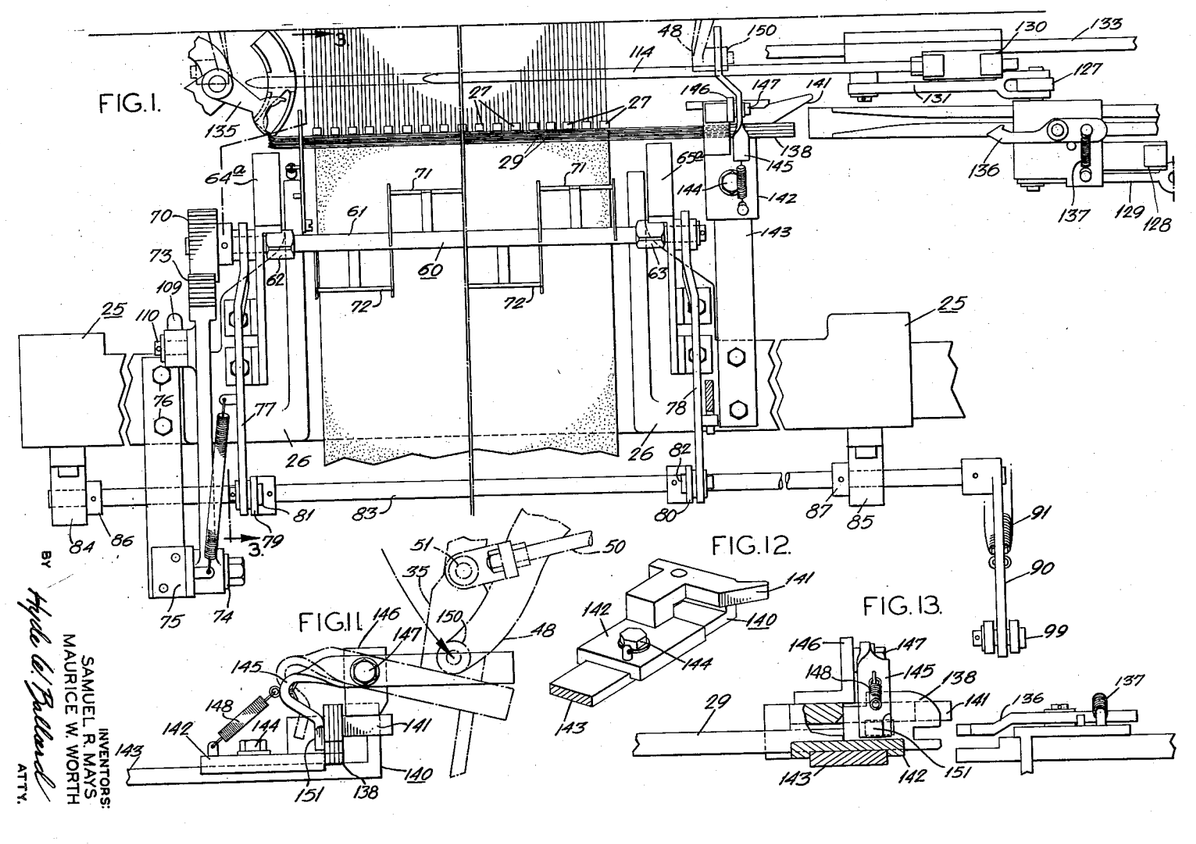
Fig. 1 is a top view of an Axminster type loom incorporated the present invention.
Fig. 11 is a fragmentary detail showing the operation of the wire mask.
Fig. 12 is a perspective of a portion of the structure of Fig. 11.
Fig. 13 is a fragmentary sectional detail showing the front view of the structure of Fig. 11 together with a portion of the wire motion.
Figure 15:
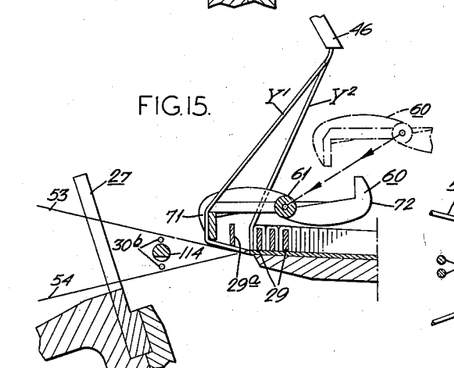

The control and actuation of the pattern bar or secondary shed forming element 60 occurs in two distinct ways. First, the entire assembly is oscillated in an inclined plane controlled by ways 64, 65 and slots 66, 67. This oscillation carries the shed forming member 60 from a shed forming position, as shown in Fig. 15, to a retracted position shown in full lines in Figs. 3 and 5. Since it is important that the same pile yarns are not always carried under each pile wire 29, it is necessary to rotate the pattern bar 60 through an arc of approximately 180° to present the staggered steps 72, 72a. This rotation of the element 60 takes place when it is in the fully retracted position of Figs. 3 and 5 so that shoulders 62 and 63 are disengaged with ways 64 and 65. In this retracted position pinion 70 meshes with the teeth of an oscillating gear section 73, journaled at 74 in a bracket 75, secured to the loom frame 25 by bolts 76, 76. The mechanism for actuating pattern bar 60 both rotationally and lineally comprises a pair of links 77 and 78, one end of each link being journaled on the shaft 61 as shown in Fig. 1 and the other end of each link being pivotally connected to levers 79 and 80 by means of pins 81 and 82 respectively. Levers 79 and 80 are keyed or pinned to a cross shaft 83 which is in turn journaled in pillow blocks 84 and 85 mounted to the frame 25 and axial movement of shaft 83 is restrained by means of collars 86 and 87 secured to shaft 83 by means of suitable setscrews. One end of shaft 83 is provided with a lever 90 also pinned or secured to the shaft and biased by an extension spring 91 anchored to the loom frame. Oscillation of shaft 83 is effected from the loom shaft 92 through a cam 93 secured to the shaft and actuating cam follower 94, link 95, rocker arm 96, pivoted to the frame 25 at 97, and connecting rod 98 which is in turn journaled to lever 90 by means of a clevis pin 99.

The gear segment 73 is likewise controlled from shaft 92 through the agency of a cam 105 keyed to the shaft, cam follower 106, rocker arm 107 journaled to frame 25 at 108, and a connecting rod 109 which is journaled to the gear 73 at 110. An extension spring 111 anchored in frame 25 likewise biases the gear 73 through a clamp 112 on rod 109. It will thus be understood that the combined motions of cams 93 and 105 serve to slide the shed forming element 60 into a shed forming position in which it is non-rotatably held by reason of the engagement of shoulders 62 and 63 with ways 64 and 65. Retraction of the shed forming element 60 permits 180° rotation of the element by gear sector 73 when the shoulders 62 and 63 are disengaged with the ways 64 and 65, this action alternately presents the steps 71 and 72 to the pile yarns Y to form successive series of secondary sheds but with yarns Y1 and Y2 alternately and successively displaced. The operation of the steps and the shed forming features of pattern bar 60 are clearly apparent from inspection of Figure 8 in which it is seen that all pile yarns Y1 forming one part of the secondary shed are displaced by the steps 71, whereas the remaining yarns Y2 remain in an undisplaced position until the pattern bar 60 is turned 180°, thereby aligning the steps 72 with the previously undisplaced yarns Y2. It is also noted that each step 71a is provided with radially extending ears 113, 113 which accurately separate the yarns and prevent their passing over the face of the steps during movement of the element 60.

Needle and wire motions

Referring now to Figs. 9–13, the needle and wire motions will be explained insofar as pertinent to the present invention. In the present loom the drive for both the needle 114 and the wire motion is provided from loom shaft 115 keyed to an interrupted ring gear 116. A pinion 117 meshes with the tooth segments on gear 116 and drives a crank 118 through shaft 119. Connecting rods 120 and 121 are each journaled at one end in the crank 118 and at the other end in cranks 122 and 123 respectively. Cranks 122 and 123 may be considered as one lever of a bell crank assembly each of which is journaled at 124 and 125 respectively. Crank 123 also connects with the main arm 126 for the wire motion and crank 122 connects with the main arm 127 for the needle motion. The upepr ends of arm 126 are connected to the wire motion head 128 by means of a link 129 and arm 127 is connected to the needle motion head 130 by means of link 131. The heads 128 and 130 oscillate on ways 132 and 133 respectively to reciprocate the needle 114 which is clamped in the head 130 in and out of the main warp yarn shed.

As is customary with needle motion looms, an oscillating shuttle assembly 135 is positioned at the opposite side of the loom to tie in the double wefts in the conventional manner. The wire motion head 128 carries a spring loaded pivoted wire catch 136 biased by means of spring 137 and operable to engage a recess in the head 138 of each of the pile wires. The left wire as seen in Figure 11 is withdrawn from the set and then inserted on the other side of the set through wire guide 140 and the head of the wire being inserted is cammed into proper position by means of beveled ways 141 on the side of the guide assembly. The upper part 142 of the wire guide assembly is adjustable on the base member 143 when lock screw 144 is loosened.

Figures 17, 21:
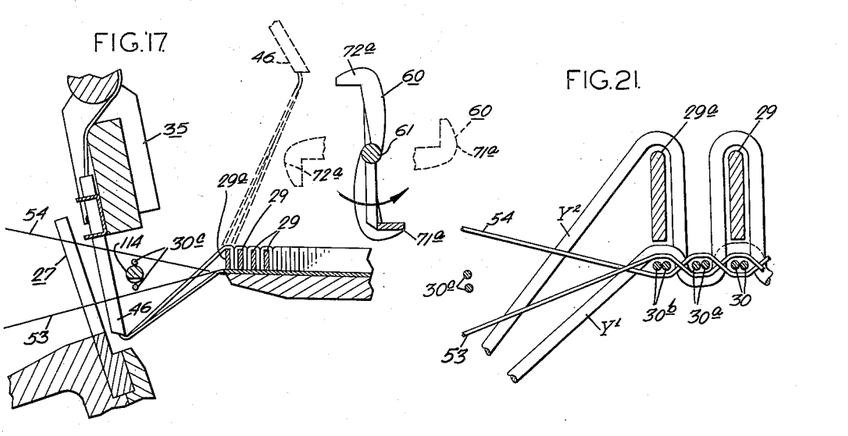

A wire mask 145 is pivoted to bracket 146 at 147 and biased by means of extension spring 148. This guard is utilized to prevent withdrawal of a wire on every insertion of the needle since there are two double wefts for every wire in a two-shot fabric as explained above. One of the clutch arms 48 is provided with a contact roller 150 which pivots the wire mask 145 whenever the tube frame 35 moves to wipe in the pile yarn as shown in Fig. 17. The mask 145 has a bent extension 151 which covers the slot in the wire head as shown in Fig. 13 unless it is pivoted to the position shown in Fig. 11. In the event the wire mask is in the unpivoted position the wire catch 136 merely slides up over the bent end 151 which prevents engagement of the catch with the wire head. Tube frame 35 wipes into the shed on every other needle insertion so that the motion of the tube frame and clutch arm 48 is utilized to control the wire motion when weaving a two-shot fabric.

Weaving cycle

Figure 14:
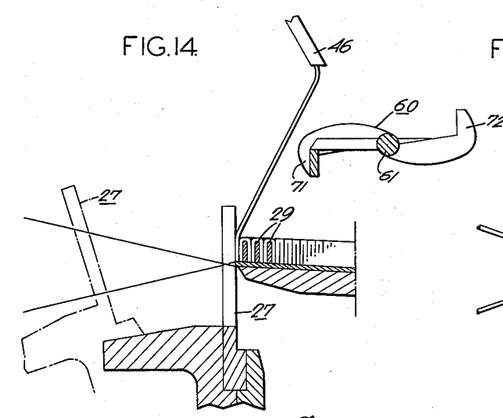
Figs. 14–17 are schematic showings indicating the progressive steps in the weaving and operation of the present invention.
Figures 16, 20:
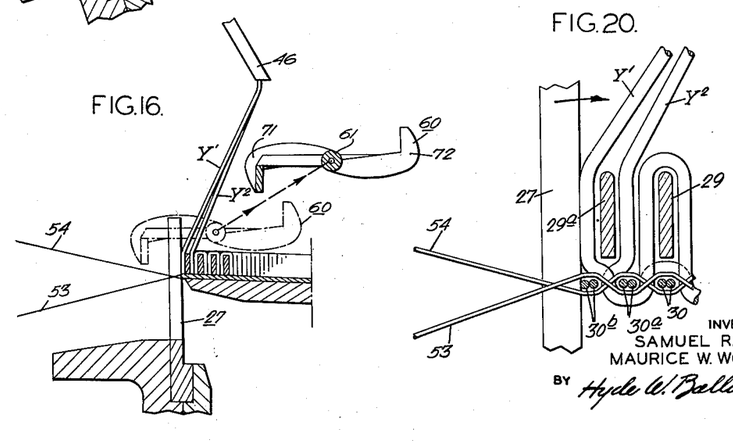
Figs. 18–21 are enlarged schematic details taken at the fell of the fabric as seen in views 14–17 respectively.
Figure 18:
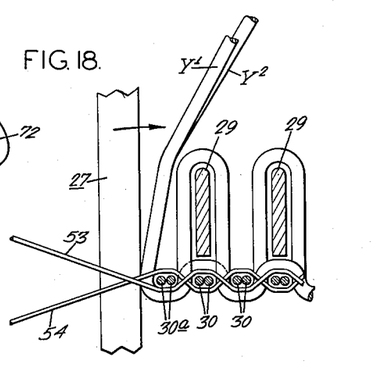
Figure 19:
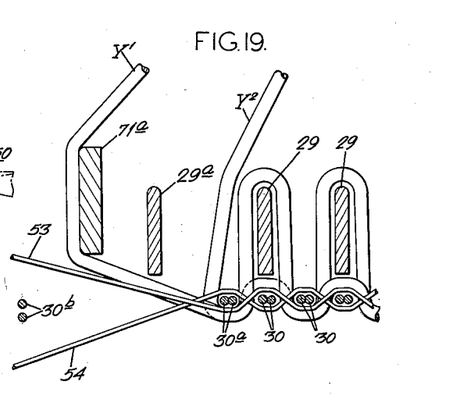

Referring now to Figs. 14–21, the weaving cycle and the steps of producing the fabric of the present invention will be described in detail. In the position of Figs. 14 and 18 the reed has beaten up the last double weft 30a into the fell of the fabric. Tuft tubes 46 are elevated and the pattern element 60 is raised to the retracted position. Chain warps 53 and 54 have been reversed after the insertion of weft 30a. (See Fig. 18.) The reed 27 now retracts as shown in Figs. 15 and 19 to permit insertion of double weft 30b and needle 114. The next pile wire 29a is simultaneously inserted in the secondary shed formed between pile warps Y1 and Y2 which have been separated by the movement of the pattern element 60 to the position shown in Fig. 15. Referring particularly of Fig. 19, it will be noticed how all of the warps Y2 which are not engaged by the steps 71 of element 60 pass upwardly to the right of wire 29a. The remaining warps Y1 which contact steps 71 or properly speaking the angled faces 71a of the steps are displaced so that all of these warps Y1 are carried under the wire 29a. The pattern element 60 again retracts as the needle is withdrawn, reed 27 beats up, and the tube frame elevates, thus beating up warps Y1 and Y2 on either side of wire 29a as shown in Fig. 20. Prior to this point the harnesses carrying binder warps 53 and 54 again reverse. The last step in the cycle is shown in Figs. 17 and 21 in which the pattern element 60 is rotated 180°, tube frame 35 lowers to wipe the tuft tubes 46 into the shed formed by chain warps 53 and 54. Reed 27 is retracted and the next double weft shot 30c is inserted with needle 114. In this case, however, no wire was inserted with needle 114 because the mask 145 was not pivoted on the previous withdrawal of the needle after insertion of the wire 29a. With the lowering of tube frame 35, however, mask 145 is pivoted to permit the last wire to be withdrawn ready for the next insertion. It will be noted in Fig. 21 that both pile yarns Y1 and Y2 are now carried down to be tied under the weft 30c, yarns Y1 coming directly from underneath wire 29a but yarns Y2 passing over this wire thus forming the desired weave. The cycle then repeats as previously described in connection with Figs. 14 and 18.

The fabric

Figure 22:
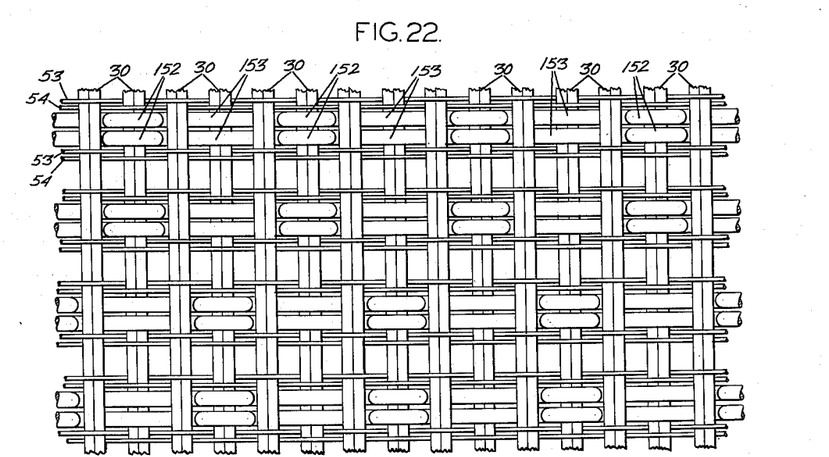
Fig. 22 is a schematic top view of a loop pile fabric woven in accordance with the present invention.
Figure 23:
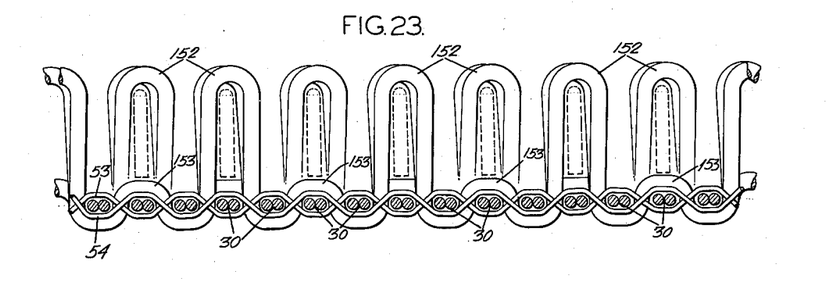
Fig. 23 is a warpwise section of the fabric of Fig. 22.
Figure 24:
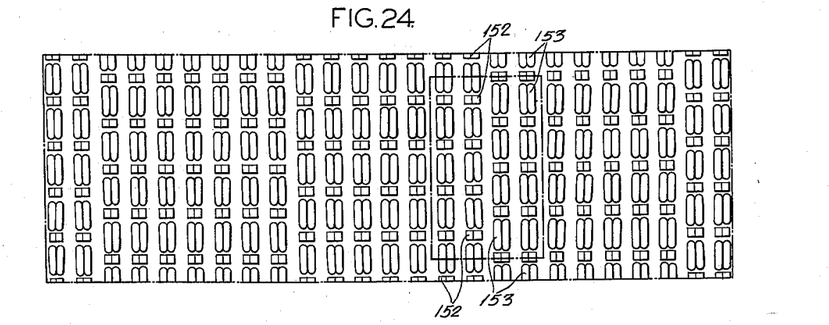
Fig. 24 is a diagrammatic showing of the pile yarns only of Fig. 22.

Referring now to Figs. 22–24, a typical fabric of the Axminster type produced in accordance with the present invention is shown schematically in Figs. 22–24. In this fabric the double wefts 30 are interwoven with the oppositely working binder warps 53 and 54 across the fabric. There will, however, be groups of high pile loops 152 which have been carried over the wires and weftwise aligned ground pile areas or low loops 153, 153 which have been carried under the same wire as already described. These high and low pile projections 152 and 153 alternate warpwise in the fabric as clearly shown in Figs. 22 and 24. Figure 23 illustrates a warpwise section of the fabric illustrating how each pile yarn alternates over and under successive pile wires. It will be understood, of course, that the pile yarns may be drawn in two ends per dent as shown and the pattern element 60 may include variations to provide differences in the weftwise length or number of loops selected for over and under the pile wires. Also, it is within the scope of the invention to employ modified shapes and forms of the pattern element 60 which facilitate carrying selected pile yarns under two or more successive pile wires or over two or more successive pile wires. Such an effect may be achieved by lateral shifting of the pattern element or utilizing less than a 180° turn.

The present invention is relatively simple and inexpensive to install on a loop pile Axminster loom of the general type shown in the Eisler and Moxley patent above. It enables the designer to utilize different types or colors of yarn effectively and increases the range of pattern effect which was not practical with the single wire loop pile loom in which all of the pile yarns were carried over the wire on each insertion. The use of a set of wires rather than a single wire provide ample locking for the pile yarns so that they are not undesirably displaced or pulled back when the pattern element is displaced to form the secondary shed.

Having thus described our invention, we claim:

1. In a loop pile Axminster type loom having a needle motion for inserting double wefts, an oscillating tube frame for wiping in pile yarns to a main warp shed, pattern means movable from a retracted to an advanced position for displacing selected warp yarns to form an auxiliary shed, a wire motion for inserting a pile wire into said auxiliary shed thereby weaving displaced pile yarns under the said pile wire and non-displaced pile yarns over the said pile wire, and means for beating up the double wefts and the pile wires into the fell of the fabric.

2. A loom in accordance with claim 1 having a plurality of pile wires in a set.

3. A loom in accordance with claim 2 having cyclically operated means for preventing withdrawal of a wire of the set after every needle insertion.

4. A loom in accordance with claim 1 in which the pattern means comprises a shaft and a series of diametrically positioned steps secured to said shaft.

5. The method of weaving a loop pile Axminster type fabric which comprises the steps of beating up a double weft against the fell of a fabric, forming a chain warp shed, displacing selected pile yarns above said fell to form a secondary warp shed, inserting a pile wire into said secondary warp shed, simultaneously inserting a weft into the chain warp shed, beating up the wire with selected pile yarns on each side of the wire, reversing the chain warps carrying both of said pile yarns down into the reversed chain warp shed, inserting a second filling weft into said reversed chain warp shed, and beating up said second filling weft over both of the pile yarns.

6. In an Axminster type loom having a needle motion for inserting double wefts, an oscillating tube frame for wiping in pile yarns to a chain warp shed, a reed for beating up said double wefts into the fell of a fabric, a shaft mounted on the loom positioned above said fell, a series of steps secured to said shaft, means for oscillating the shaft to a warp shed forming position adjacent the fell thereby forming an auxiliary warp pile shed, and a wire motion for inserting a pile wire into said warp pile shed thereby weaving certain displaced pile yarns under said pile wire and other pile yarns over the said pile wire.

7. In an Axminster type loom having a needle motion for inserting double wefts, an oscillating tube frame for wiping in pile yarns to a chain warp shed, a reed for beating up said double wefts into the fell of a fabric, a shaft mounted on the loom positioned above said fell, a series of steps secured to said shaft, means for oscillating the shaft to a warp shed forming position adjacent the fell thereby forming an auxiliary warp pile shed, and means for rotating said shaft on successive oscillations thereof.

8. Apparatus in accordance with claim 7 in which the steps are attached to the shaft in staggered diametrical relationship to each other.

9. Apparatus in accordance with claim 7 in which the steps are provided with ears for weftwise retention of pile warps.

10. Apparatus in accordance with claim 8 in which the oscillating means comprises a series of links and levers and a slotted guide in each side of the loom from which the shaft extends.

11. Apparatus in accordance with claim 10 in which the slotted guide is provided with means for preventing rotation of the shaft when in its yarn displacing position.

References Cited in the file of this patent

UNITED STATES PATENTS

| | | |
|---|---|---|
| 2,715,918 | Eisler et al. | Aug. 23, 1955 |
| 2,859,778 | Janney et al. | Nov. 11, 1958 |